W. H. MACKRELL.
Shutter Fastener.
No. 18. Reissued Dec. 10, 1839.
6593X
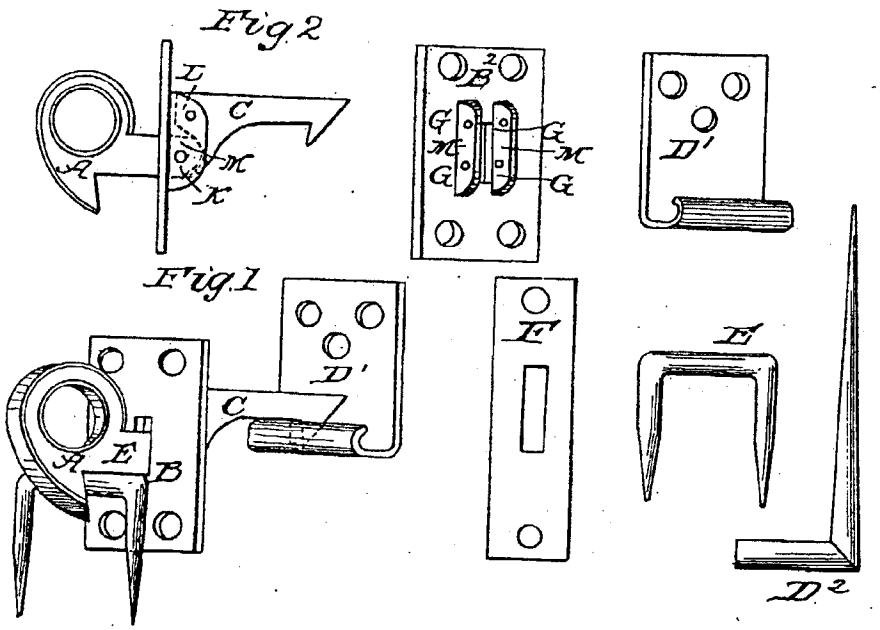
WITNESSES
Clinton Roosevelt
Isaac Roosevelt
INVENTOR
William H. Mackrell

UNITED STATES PATENT OFFICE.

WILLIAM H. MACKRELL, OF NEW YORK, N. Y.

IMPROVEMENT IN FASTENERS FOR SHUTTERS AND BLINDS.

Specification forming part of Letters Patent dated June 13, 1831; Reissue No. 18, dated December 10, 1859.

*To all whom it may concern:*

Be it known that I, WILLIAM H. MACKRELL, of the city, county, and State of New York, have invented a new and useful Improvement in the Art of Making Shutter and Blind Fasteners, of which the following is a specification.

To enable others skilled in the art to make and use my invention, I will proceed to give a full, clear, and exact description of its construction and operation, reference being had to the accompanying drawings, making part of this specification, in which—

Figure 1 is a perspective view of said fasteners, and Fig. 2 a side view of the latches and plate to which they are attached.

The fastener is made to be fitted in a window shutter or blind. To this end a plate of brass, iron, or other suitable metal is made, as represented in B′ and B², with flanges M M, as in B², perforated with holes G G, Fig. 3, to admit pivots, as shown at K and L in Fig. 2. These pivots are to hold the latches in their places, and serve also as fulcrums when the inner latch, A, operates as a lever to raise the outer latch, C, which is done by raising the handle of the inner latch, A, which yond the pivot K to descend and press upon causes that part of the latch A which is be- the horn I of the latch C, the effect of which is to unfasten the said outer latch, C, from the catch D′ when fitted to a wooden building, or D² when on a brick or stone building, the two catches being severally made for these purposes, to wit: D′, a bent plate with screw-holes through it, as shown in the drawings, and D² an iron rod sharpened at one end and bent at right angles at the other, as is also represented in the drawings. The staple E is to be driven into the window-sill, and when the shutter or blind is closed the latch A catches on said staple, and cannot be unfastened, except from the inside; and herein consists one of the chief advantages of my invention, that while the fastener is perfectly manageable to the householder, the house-breaker can have no advantage from it, for, by raising the handle of the latch A, either latch is thrown clear of catch or staple, whereas by raising the outer latch, C, it plays clear of the inner latch, and by depressing the outer latch it only fastens the inner latch the more firmly in its hold on the staple E when the shutter or blind is closed.

F is an escutcheon for the outer latch, C, to be screwed on the outside of the shutter or blind.

What I claim as my invention, and desire to secure by Letters Patent, consists in—

The combination of two latches in a frame, so that the inner latch may unfasten the outer latch without having the inner latch subject to being unfastened by the outer latch, and that by the means above set forth.

WILLIAM H. MACKRELL.

Witnesses:

ISAAC ROOSEVELT,

ROBT. GILES, Jr.

Scanned at National Archives in Kansas City